United States Patent [19]

Kellner

[11] Patent Number: 4,480,634
[45] Date of Patent: Nov. 6, 1984

[54] SOLAR COLLECTOR

[76] Inventor: Bernd Kellner, Oskar-Messter-Str. 16, D-8045 Ismaning, Fed. Rep. of Germany

[21] Appl. No.: 485,397

[22] Filed: Apr. 15, 1983

[30] Foreign Application Priority Data

Apr. 20, 1982 [DE] Fed. Rep. of Germany ....... 3214631

[51] Int. Cl.³ .............................................. F24J 3/02
[52] U.S. Cl. .................................. 126/443; 126/141; 126/450
[58] Field of Search ............... 126/442, 443, 446, 447, 126/448, 450

[56] References Cited

U.S. PATENT DOCUMENTS

| 3,961,619 | 6/1976 | Estes et al. | 126/444 |
| 3,972,317 | 8/1976 | Gallagher | 126/446 |
| 4,011,856 | 3/1977 | Gallagher | 126/446 |
| 4,164,935 | 8/1979 | Marles et al. | 126/447 |
| 4,281,642 | 8/1981 | Steinberg | 126/447 |

FOREIGN PATENT DOCUMENTS 0052759 3/1982 Japan ................................... 126/450

Primary Examiner—Margaret A. Focarino
Attorney, Agent, or Firm—Sixbey, Friedman & Leedom

[57] ABSTRACT

An evacuatable solar collector, comprising a collector tub, a radiotransparent pane sealingly covering the tub, an absorber arranged below the pane, and support members passing through the absorber and having a limited cross-section whereby, in the evacuated state of the absorber, said support members support the pane in punctiform manner from the inside in places distributed over the surface area thereof, against the action of the external atmospheric pressure, wherein the support members in turn are supported against means engaging with the bottom of the collector tub and which bring about a distribution of the forces exerted by the support members on the tub bottom counteracting marking of the latter.

6 Claims, 5 Drawing Figures

U.S. Patent Nov. 6, 1984 Sheet 2 of 2 4,480,634
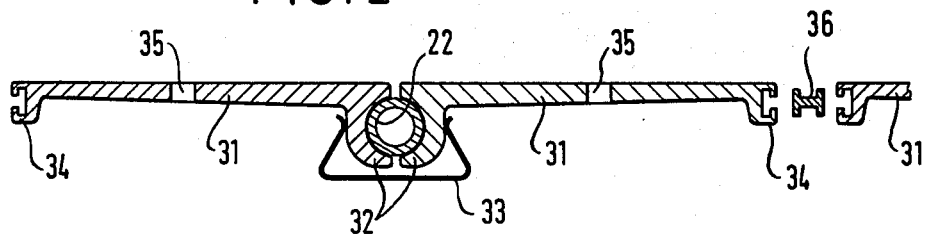
FIG. 2
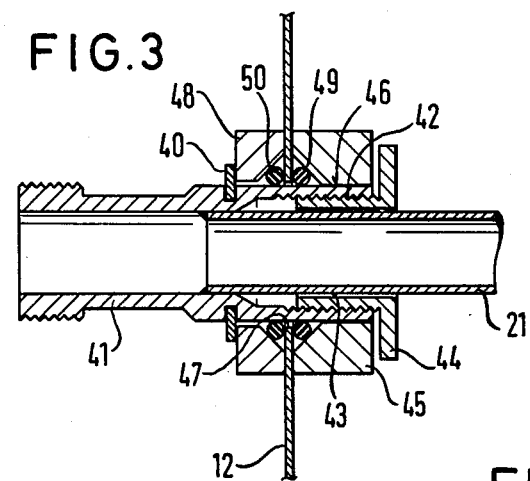
FIG. 3
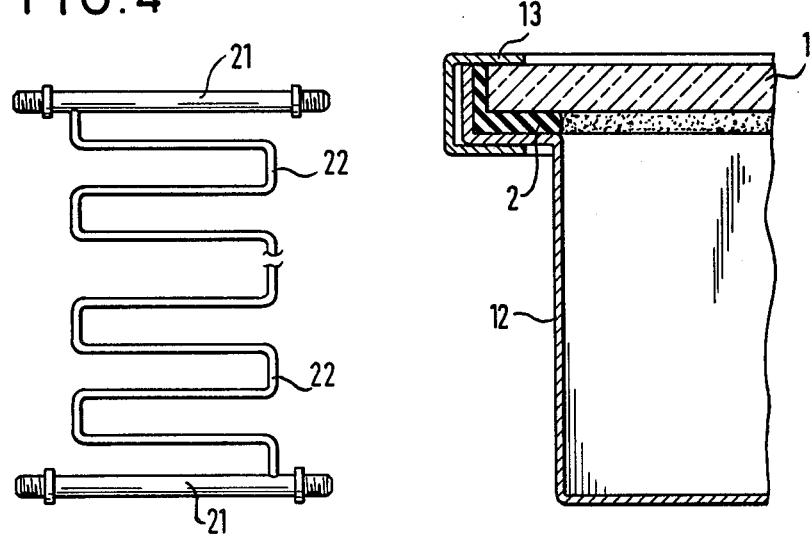
FIG. 4
FIG. 5

SOLAR COLLECTOR

BACKGROUND OF THE INVENTION

The present invention relates to an evacuatable solar collector, comprising a collector tub, a radiotransparent pane sealingly covering the tub, an absorber arranged below the pane and support members passing through the absorber and having a limited cross-section whereby, during evacuation, said support members support the pane in punctiform manner from the inside in places distributed over the surface area thereof, against the action of the external atmospheric pressure.

DOS No. 27 28 019 discloses a solar collector, in which the rod-shaped or tubular support members rest directly on the collector bottom, which is typically formed by a metal sheet having a thickness of 1 mm to 2 mm. The resulting forces acting in almost punctiform manner on the collector bottom lead to the plastic deformation thereof at the points of the support members, so that, in time, the latter start to be marked towards the outside. This not only gives the appearance of gradual wear, to the solar collector, but also, in time, leads to changes in the static conditions with which the collector pane is supported. Thus, for example, on ventilating the collector, the cover pane comes away from the downwardly sagged support members, and conversely on evacuating the collector again, this must lead to the plate not being underpinned from the outset by the support members and is instead only drawn against them with an impact.

SUMMARY OF THE INVENTION

It is an object of the invention to eliminate this problem

It is another object of the invention to provide a solar collector having an absorber of good heat efficiency and coping with thermal deformations.

The invention provides on a collector mentioned in the outset that the support members in turn supported against means engaging with the bottom of the collector tub and which bring about a distribution of the forces exerted by the support members on the tub bottom counteracting marking of the latter.

According to a preferred development of the invention, the means comprise a metal sheet against which the support members are supported, and an insert provided between the metal sheet and the tub bottom, which forms spaces beneath the support points of the support members and, for the rest, such a thickness in the direction of the forces exerted by the support members on the tub bottom, that the metal sheet bowing into the spaces under tthe influence of these forces does not contact the tank bottom, or only contacts it with a limited contact pressure. The spaces are preferably chosen in such a way that their edges surrounding the support members are at such a distance from the pressure points of said support members, that under the action of the contact pressures, the metal sheet can elastically deform, substantially without any permanent plastic deformation.

Preferably, the insert is formed by a lattice structure with crosswise-directed lattice wires, the support members being supported on the metal sheet above the lattice spaces. Such an arrangement is particularly effective and is made available in a particularly simple manner.

According to a further preferred embodiment of the invention, the means are formed by a metal sheet profiled with elevations on which are supported the support members.

BRIEF DESCRIPTION OF THE DRAWINGS

The invention is described in greater detail hereinafter relative to non-limitative embodiments and the attached drawings, wherein show:

FIG. 2 a detail of the absorber.

FIG. 3 a detail of a compression screw coupling for the sealed passage of an absorber collecting pipe through the absorber tub.

FIG. 4 the absorber piping system.

FIG. 5 a detail of the fitting of the collector cover plate to the collector tub.

DETAILED DESCRIPTION OF THE INVENTION

Figure 1:
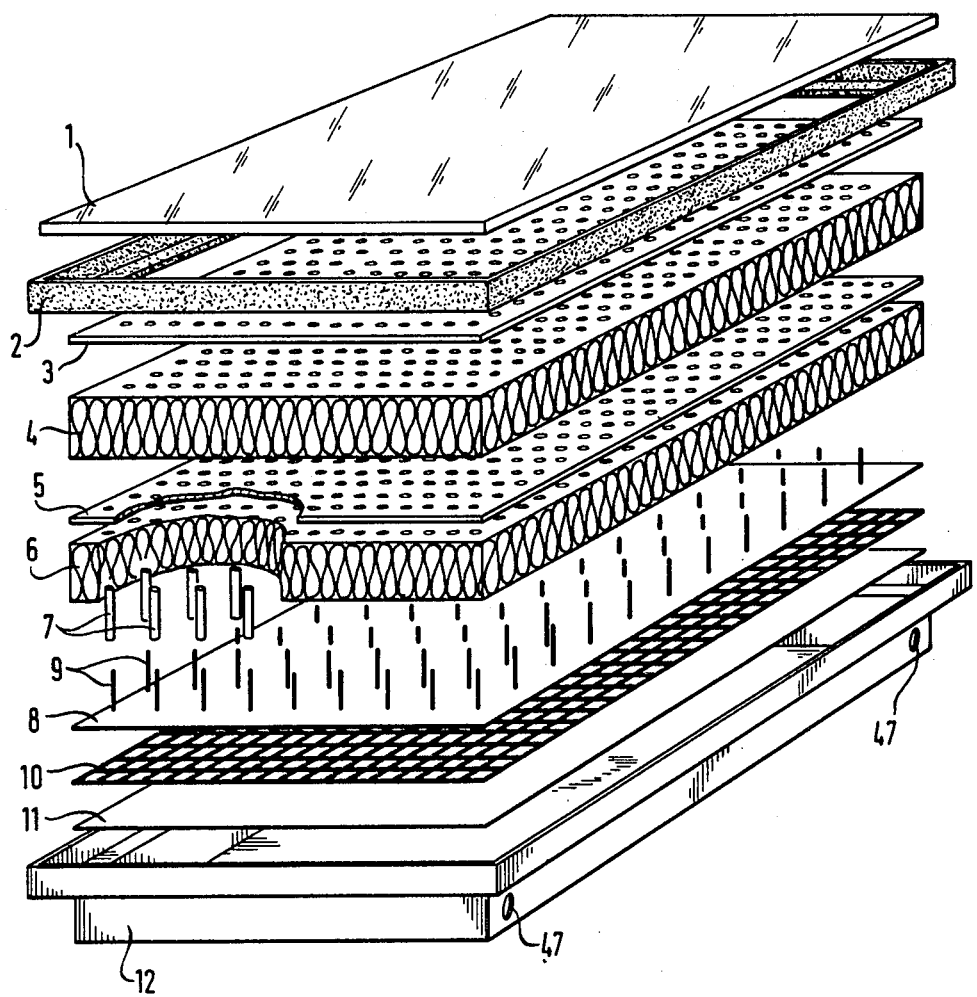
FIG. 1 a perspective exploded view of a solar collector.

According to FIG. 1, a box-shaped absorber tub 12 with a rectangular plan view is provided, which at its upper edge is widened in step-like manner, so as to provide a frame-like support for an angular seal or gasket 2 and on which rests a transparent or radiotransparent glass plate 1 sealing the top of the absorber tub. Gasket 2 is elastic and sufficiently soft that, on evacuating the collector, it absorbs deformations of the absorber tub, which is typically made from a metal sheet of thickness 1 mm to 2 mm and consequently keeps away from the glass plate, the non-uniform stresses and strains, which are prejudicial thereto.

A reflection foil 11, e.g. of aluminium, is provided on the collector tub bottom. On this reflection foil 11, rests a metal lattice 10 with a square aperture size of a few centimeters. On the metal lattice rests a metal plate 8, on to which are welded in regularly distributed manner rod-shaped support holders 9, e.g. by using a stud welding machine. The welding spots of support holders 9 and metal lattice 10 are matched to one another in such a way that in each case the support holders 9 are positioned above the lattice spaces, i.e. approximately in the centre of the lattice squares resulting from the lattice wires. On to the support holders 9 are mounted support tubes 7, e.g. made from a poorly heat conducting metal and whose internal diameter is matched to the diameter of the support holders in such a way that they can be easily mounted thereon, without leaving an excessive clearance. The support tube ends resting against glass plate 1 are rounded, e.g. by outward bending, in order to avoid damaging the glass plate and prevent edge loading (self-positioning of the support tubes).

The support holders, together with the support tubes pass through an insulating mat, e.g. of glass wool, pressed on to metal sheet 8 and on which is placed a further reflection foil 5, e.g. of aluminium, and a further insulating mat 4, e.g. of glass wool. The support structure of the support holders 9 and support tubes 7 also passes through reflection foil 5 and insulating mat 4. The same applies regarding an abosrber 3 shown only diagrammaticly in FIG. 1 and which is located under glass plate 1.

It can be gathered from FIGS. 2 and 4 that there is provided on the bottom of the absorber piping 22 preferably made of copper having a meander-like configuration and whose two ends issue into collecting pipes 21, which pass through holes 47 of the collector tube 12 in the long side walls in the vicinity of the corners and by means of which the heat transfer medium is passed through the meander-shaped piping 22. As can be gathered from FIG. 2, on the portions of piping 22 running parallel to the short sides of collector tub 12 are applied from two sides a strip-like metal plate, preferably made of aluminium, parallel to the short sides of the collector tub 12 and having under its plane an extension 22 with a semicircular recess adapted to the cross-section of piping 22. Thus, piping 22 is connected from two sides with a plate 31, a clamp-like member 33 pressing plates 31 against the piping so as to provide good thermal conduction there between. On the longitudinal edge of plate 31 remote from piping 22, a further extension 34, having a T-shaped recess, is provided beneath its plane. With a mirror-inverted identical construction at this point, a further plate 31 is connected to said edge of the first plate 31. The second plate 31 is fitted in the same way as described hereinbefore by its other longitudinal edge to the adjacent section of piping 22 running parallel to the short side of collector tub 12. The two T-shaped recesses of adjacent plates 31 in extensions 34 are interconnected loosely, providing a poor thermal contact, by a double-T-rail 36 having a cross-section corresponding to the recesses. This leads to a movable, closed absorber surface under which pass piping 22 and collecting pipes 21 on which rest the end plates of the plates 31. The cross-section of plates 31 is so selected in the sense of a heat flow to piping 22, that in the vicinity of the latter it is thicker than in the vicinity of the double-T-rails. In positions matched to the support holders 9, plates 31 have bores 35 for a contact-free passage thereof and the support tubes resting thereon. A plurality of collectors can be interlocked in parallel by means of the collecting pipes.

As stated hereinbefore, collector tub 12 is covered by a radiotransparent glass plate 1, supported by support tube 7, and which rests by means of correspondingly shaped elastic gasket 2 on the edge step of collector tub 12. Collector tub 12, gasket 2 and glass plate 1 are clamped together by an all-round U-section 13 (cf. FIG. 5).

As the aforementioned solar collector is evacuatable (by means of a suction connection not shown in the drawings), the connection between glass plate 1 and collector tank 12 must be air-tight, which also applies to the passage of collecting pipes 23 through collector tank 12.

FIG. 3 shows a compression screw coupling for the end pieces of collecting pipes 21 with respect to collector tub 12. Collecting pipe 21 is welded into a pipe socket 41, which is placed round collecting pipe 21 on one side with an internal thread 42 and whilst maintaining an annular gap 43. A ring nut 44 with an external thread is screwed into thread 42, and presses against a ring 45, which is displaceable on a cylindrical outer jacket 46 of pipe socket 41. In the fitted state, when the pipe connection 41 passes through a bore 47 provided in the wall of absorber tub 12, said ring is located on one side of the absorber tub. In homologous manner, on the other side of the tank is provided a substantially identically constructed ring 48 which, on its side remote from the tank wall, is prevented by a retaining ring 40 from moving away from the wall. On their sides facing the wall, rings 45 and 48 have conical faces ensuring the squeezing of the gasket rings 49, 50 located on either side of the wall, when nut 44 pressing against ring 45 is tightened with retaining ring 40, as an abutment preventing an axial yielding of ring 48.

This construction has the advantage that by removing retaining ring 49 and loosening nut 44, it can be disassembled and displaced to such an extent that, on assembling the collectors, it does not prevent the passing of the ends of the collecting pipes through bores 47 in an oscillating movement (i.e. firstly through the bores of one longitudinal tub wall and then through the bores of the opposite wall).

On evacuating the collector, the covering glass plate 1 presses against the support tubes 7, under the pressure of the external air, so that the metal plate 8, formed by a metal sheet, is loaded in punctiform manner at the sites of said support tubes. The engagement points of the support tubes with metal plate 8 are framed on the other side of the latter by the squares of metal lattice 10. The mesh size is chosen sufficiently large that metal plate 9, in the manner of a diaphragm, can elastically curve into the frame without contacting the bottom of the collector tank (or the reflection foil resting thereon) in a way that significant forces are exerted thereon, or even without contacting it at all. For this purpose, the wires of the lattice 10 used have a height of a few millimeters.

The described and represented solar collector has a ground plan of approximately $1 \times 2$ meters. The thickness of the tub 12 and of the metal plate 8 is approximately 1–2 mm, depending on the material used.

Though the absorber of FIGS. 1 and 2 has been described in connection with an evacuatable solar collector, it can similarly be used as a part of a solar collector which is not evacuatable. As far as the tub, the covering pane and the insulating layers are concerned, such solar collector can be constucted similarly as the one described above. What is omitted is the supporting system for the covering pane so that the through holes 35 in the absorber plates can be omitted as well.

Instead of a meander-like piping 22, several pipes being substantially parallel to each other and extending substantially at right angles from the collecting pipes 2 can be used as well. In this case, the direction of plates 31 is rotated by 90°.

Like the absorber, also the compression screw coupling of FIG. 3 can be used in a collector which is not evacuatable.

What is claimed is:

1. An evacuatable solar collector, comprising a collector tub, a radiotransparent pane sealingly covering the tub, an absorber arranged below the pane, and support members passing through the absorber and having a limited cross-section whereby, in the evacuated state of the collector, said support members support the pane in punctiform manner from the inside in places distributed over the surface area thereof, against the action of the external atmospheric pressure, wherein the support members in turn are supported against means engaging with the bottom of the collector tub and which bring about a distribution of the forces exerted by the support members on the tub bottom counteracting marking of the latter, wherein the means comprise a metal sheet against which the support members are supported, and an insert provided between the metal sheet and the tub bottom, which forms spaces beneath the support points of the support members and which also has such a thickness in the direction of the forces exerted by the support members on the tub bottom, that the metal sheet bowing into the spaces under the influence of these forces does not contact the tank bottom, or only contacts it with a limited contact pressure.

2. A solar collector according to claim 1, wherein the insert is formed by a lattice structure with crosswise-directed lattice wires, the support members being supported on the metal sheet above the lattice spaces.

3. A solar collector according to claim 1, wherein said absorber comprises a piping to be passed by the heat transfer medium having portions running substantially in parallel to each other, and substantially parallel strip-like metal plates overlying the piping and substantially forming a continuous plane of similar dimensions as the collector, two strip-like plates being clamped to each of said parallel portions of said piping from opposite sides thereof so as to provide a good thermal contact thereto, a strip-like plate clamped to one of the parallel portions of the piping and an adjacent strip-like plate clamped to an adjacent one of the parallel portions of the piping being loosely connected so as to provide a poor thermal contact.

4. A solar collector according to claim 3, wherein each strip-like plate has a wedge-like form thickening towards the piping portion to which it is clamped.

5. A solar collector according to claim 4, wherein each strip-like plate has under its plane a projection extending along one of its edges and forming a recess adapted to the cross-section of the piping portion to which it is clamped.

6. A solar collector according to claim 5, wherein each strip-like plate has another projection extending under its plane along the edge remote from the piping portion to which it is clamped, said other projection forming a T-shaped recess, a double-T-shaped rail loosely engaging the T-shaped recess being provided for connecting two adjacent strip-like plates which are clamped to adjacent piping portions, at edges thereof remote from the piping portions to which they are clamped.

* * * * *